United States Patent
Evans et al.

(10) Patent No.: US 12,134,984 B1
(45) Date of Patent: Nov. 5, 2024

(54) FLUIDIC COMPRESSOR INLET GUIDE VANES

(71) Applicant: RTX CORPORATION, Farmington, CT (US)

(72) Inventors: Simon W. Evans, Farmington, CT (US); Christopher J. Hanlon, Sturbridge, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/512,433

(22) Filed: Nov. 17, 2023

(51) Int. Cl.
*F02C 7/143* (2006.01)
*B64D 33/08* (2006.01)

(52) U.S. Cl.
CPC ............ *F02C 7/1435* (2013.01); *B64D 33/08* (2013.01); *F05D 2260/211* (2013.01)

(58) Field of Classification Search
CPC .... F05D 2260/211; F02C 7/1435; F02C 7/22; B64D 33/08; B64D 37/02; B64D 37/30
See application file for complete search history.

(56) References Cited

U.S. PATENT DOCUMENTS

| | | | |
|---|---|---|---|
| 3,100,964 A | 8/1963 | Bevers et al. | |
| 4,569,195 A | 2/1986 | Johnson | |
| 6,553,753 B1 * | 4/2003 | Payling | F01K 21/047 60/785 |
| 9,074,533 B2 | 7/2015 | Hiller | |
| 11,846,234 B2 * | 12/2023 | Sibilli | F02C 7/224 |
| 2002/0083713 A1 | 7/2002 | Loebig et al. | |
| 2005/0279101 A1 * | 12/2005 | Hoffmann | F02C 7/1435 60/39.3 |
| 2023/0258130 A1 * | 8/2023 | Terwilliger | F02C 7/224 60/266 |

FOREIGN PATENT DOCUMENTS

FR  3073002 B1  11/2020

* cited by examiner

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A propulsion system for an aircraft includes an intercooling system with a plurality of injectors for injecting an intercooling waterflow into a portion of a compressor passage. The plurality of injectors are spaced apart about the compressor passage and the injection of the intercooling water flow is varied between the plurality of injectors to influence flow that is communicated through the compressor passage.

17 Claims, 5 Drawing Sheets

FLUIDIC COMPRESSOR INLET GUIDE VANES

TECHNICAL FIELD

The present disclosure relates generally to an intercooled turbine engine where water is injected into a compressor section.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Inlet guide vanes are utilized to set an angle of air flow into compressor sections. The angle of airflow may vary based on engine operating points. Gaps around movable inlet guide vanes generate secondary losses that reduce overall compressor efficiency. Moreover, an intercooling flow of water can be injected into a compressor to cool flow and improve efficiency. However, distortions within the compressor can reduce compressor efficiency and operability.

Turbine engine manufacturers continue to seek further improvements to engine performance including improvements to reduce environmental impact while improving propulsive efficiencies.

SUMMARY

A propulsion system for an aircraft according to an exemplary embodiment of this disclosure includes, among other possible things, a core engine that includes a core flow path where air is compressed in a compressor section, communicated to a combustor section, mixed with fuel, and ignited to generate a high energy gas flow that is expanded through a turbine section. The compressor section includes a low pressure compressor that is upstream of a high pressure compressor. An intercooling system is configured to inject water into the compressor section to reduce a temperature of a core airflow within the core flow path. The intercooling system includes a plurality of injectors for injecting an intercooling waterflow into a portion of a compressor passage. The plurality of injectors are spaced apart about the compressor passage and the injection of the intercooling water flow is varied between the plurality of injectors to influence flow that is communicated to the high pressure compressor.

In a further embodiment of the foregoing propulsion system, the volume of the intercooling waterflow is varied based on a circumferential position within the compressor passage.

In a further embodiment of any of the foregoing propulsion systems, the volume of the intercooling waterflow is varied based on a radial position within the compressor passage.

In a further embodiment of any of the foregoing propulsion systems, a pressure of intercooling waterflow through at least one of the plurality of injectors is different than another of the plurality of injectors.

In a further embodiment of any of the foregoing propulsion systems, the compressor passage includes an annular passage for directing an airflow from an exit of the low pressure compressor to an inlet of the high pressure compressor. The plurality of injectors is disposed within the annular passage for generating the combined airflow and water through the annular passage to the inlet of the high pressure compressor.

In a further embodiment of any of the foregoing propulsion systems, the plurality of injectors are spaced circumferentially apart about both an inner radial surface and an outer radial surface of the annular passage.

In a further embodiment of any of the foregoing propulsion systems, the plurality of injectors are spaced radially apart between an inner radial surface and an outer radial surface of the annular passage.

In a further embodiment of any of the foregoing, the propulsion system includes a controller that is programmed to control injection of the cooling waterflow through the plurality of injectors.

In a further embodiment of any of the foregoing propulsion systems, the controller is programmed to receive information indicative of an engine operating condition and to control injection of waterflow through the plurality of injectors based on the information indicative of the engine operating condition.

In a further embodiment of any of the foregoing propulsion systems, the controller is programmed to receive information indicative of a distortion profile within the compressor passage and to control injection of the waterflow based on the information indicative of the distortion profile.

In a further embodiment of any of the foregoing propulsion systems, the distortion profile includes one of a temperature profile and a flow pattern profile.

In a further embodiment of any of the foregoing propulsion systems, the controller is programed to control injection of waterflow through the plurality of injectors to generate a desired flow profile of a combined water and air flow to the high pressure compressor.

In a further embodiment of any of the foregoing, the propulsion system further includes a condenser that is arranged along the core flow path and configured to extract water from the high energy gas flow.

In a further embodiment of any of the foregoing propulsion systems, an evaporator is arranged along the core flow path and configured to receive a portion of the water that is extracted by the condenser to generate a steam flow. The steam flow is injected into the core flow path upstream of the turbine section.

An intercooling system for a turbine engine according to another exemplary embodiment of this disclosure includes, among other possible things, a condenser that is arranged along a core flow path and configured to extract water from an exhaust gas flow, a pump where water from the condenser is pressurized, and a plurality of injectors for injecting an intercooling waterflow into a portion of a compressor passage. The plurality of injectors are spaced apart about the compressor passage and the injection of the intercooling water flow is varied between the plurality of injectors to influence flow that is communicated to a high pressure compressor.

In a further embodiment of the foregoing intercooling system, at least one of a volume and pressure of the intercooling waterflow is varied based on a circumferential position within the compressor passage.

In a further embodiment of any of the foregoing intercooling systems, at least one of a volume and pressure of the intercooling waterflow is varied based on a radial position within the compressor passage.

A method of operating a compressor section of a turbine engine according to another exemplary embodiment of this disclosure includes, among other possible things, generating a pressurized airflow through a first compressor section, injecting a pressurized waterflow with at least one of a plurality of injectors to generate a combined pressurized air and waterflow, communicating the combined pressurized air and waterflow to a second compressor section downstream of the first compressor section, determining a distortion profile of the combined pressurized air and waterflow, and varying at least one of a volume and pressure of the intercooling waterflow between the plurality of injectors based on the determined distortion profile within a compressor passage between the first compressor section and the second compressor section.

In a further embodiment of the foregoing, the method further includes varying at least one of a volume and pressure of the intercooling waterflow that is varied based on a circumferential position within the compressor passage.

In a further embodiment of any of the foregoing, the method further includes varying at least one of a volume and pressure of the intercooling waterflow that is varied based on a radial position within the compressor passage.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
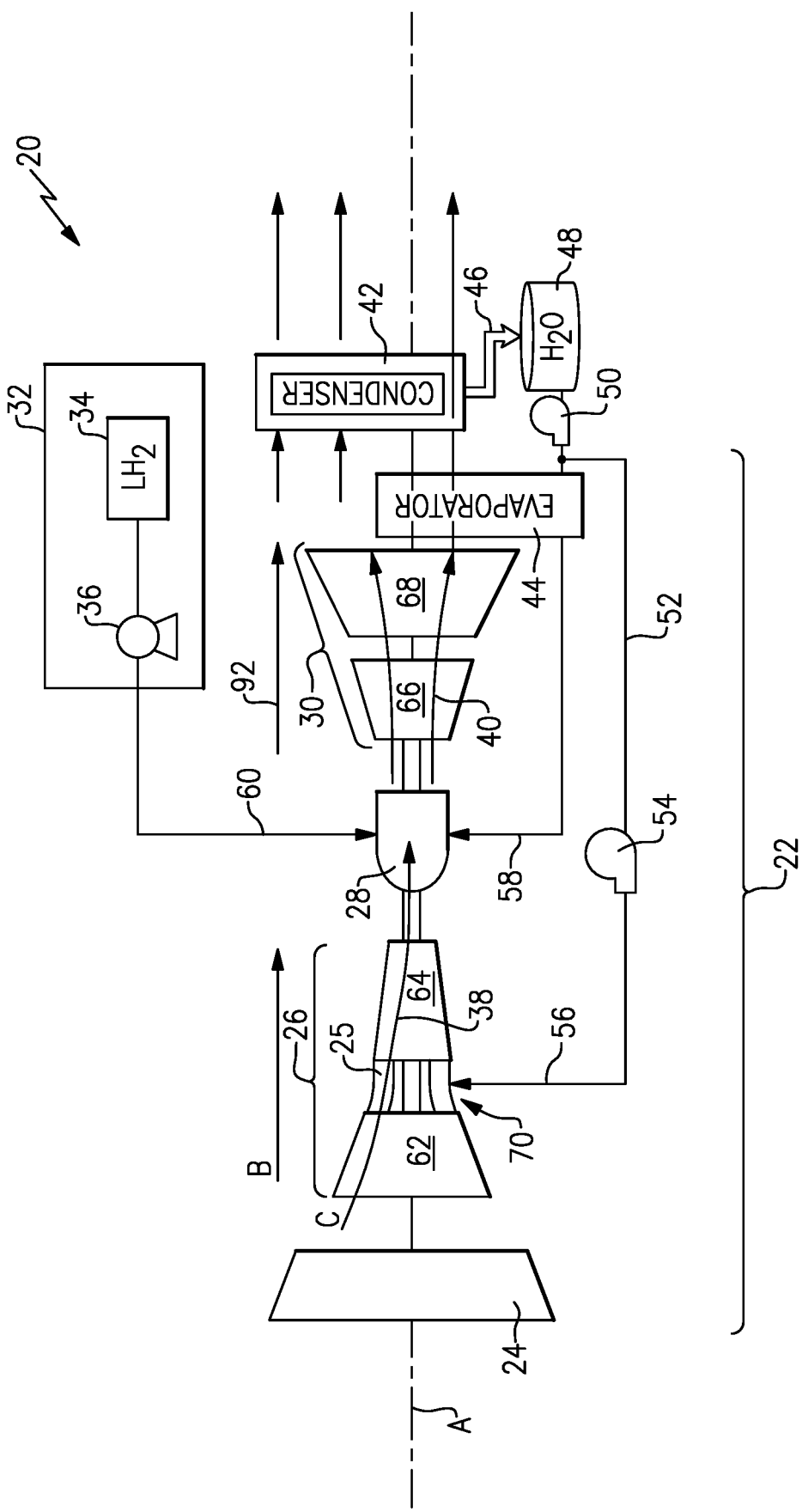
FIG. 1 is a schematic view of an example propulsion system embodiment.

FIG. 1 schematically illustrates an example propulsion system 20 that includes an intercooling waterflow that is injected in a manner and direction that compensates for temperature, swirl, and flow distortions of a combined air and waterflow to a high pressure compressor section.

The example propulsion system 20 is a hydrogen steam injected inter-cooled turbine engine with a core engine 22. The core engine 22 includes a core airflow path C through a fan 24, a compressor section 26, a combustor 28 and a turbine section 30 arranged along an engine longitudinal axis A. A fuel system 32 includes a hydrogen ($H_2$) fuel storage tank 34 and a fuel pump 36 to generate a fuel flow 60. The fan 24 drives inlet air as a core flow 38 into the compressor section 26. In the compressor section 26, the core flow 38 is compressed and communicated to the combustor 28. In the combustor 28, the core flow 38 is mixed with the hydrogen ($H_2$) fuel flow 60 and ignited to generate a high energy gas flow 40 that expands through the turbine section 30 where energy is extracted and utilized to drive the fan 24 and the compressor section 26. A bypass flow 92 may flow through the fan 24 and a bypass flow path B around the remaining components of the core engine 22.

The high energy gas flow 40 is exhausted from the turbine section 30 and communicated through a condenser 42 and an evaporator 44. The condenser 42 uses bypass airflow 92 to cool a portion of the exhaust gas flow 40 to extract water 46 that is stored in a tank 48. A pump 50 moves water through the evaporator 44. In the evaporator 44, heat from the exhaust gas flow 40 is used to transform at least a portion of water into a steam flow 58. The steam flow 58 is injected into the combustor 28 or other locations within the core flow path C.

The example core engine 22 has an increased power output from the injected steam due to an increasing mass flow through the turbine section 30 without a corresponding increase in work from the compressor section 26. An example engine operation cycle may include up to (or more than) 35% steam-air-ratios (SAR) and may be assisted by a multiple fold (e.g., 2x, 3x, etc.) increase in moisture from burning $H_2$ as the fuel.

An intercooling flow of water 52 may be communicated to the compressor section 26 to reduce a temperature of the core airflow 26 and increase mass flow. Reduced temperatures and increased mass flow provided by injection of water increases compressor efficiency.

The example compressor section 24 includes a low pressure compressor (LPC) 62 and a high pressure compressor (HPC) 64 separated by an annular passage 70. The turbine section 30 includes a high pressure turbine (HPT) 66, and a low pressure turbine (LPT) 68. The turbines 66 and 68 are coupled to a corresponding compressor section 62, 64. In this disclosed example, the HPT 66 is coupled to drive the HPC 64. The LPT 68 is coupled to drive the LPC 62 and the fan 24. In some examples, the LPT 68 may be coupled to the fan 24 via a gearbox that is configured to reduce the speed of the shaft relative to the LPT 68 and/or the LPC 62. Although the example core engine 22 is described and shown by way of example as a two-spool engine, other engine configurations and architectures may also benefit from this disclosure and are within the contemplation and scope of this disclosure.

The example core engine 22 includes an intercooling pump 54 that generates a pressurized intercooling waterflow 56 that is injected into a location between the LPC 62 and the HPC 64.

Previous compressor sections would utilize a variable inlet guide vane at the inlet to direct airflow into the HPC. Such inlet guide vanes are a potential source of efficiency losses because some airflow may leak past the inlet guide vane. Disclosed example embodiments eliminate the inlet guide vane and utilize water injection for intercooling to direct and generate desired flows into the HPC. Moreover, disclosed example embodiments vary waterflow to mitigate distortions and uneven temperature and flow distributions at various engine operating points.

Figure 2:
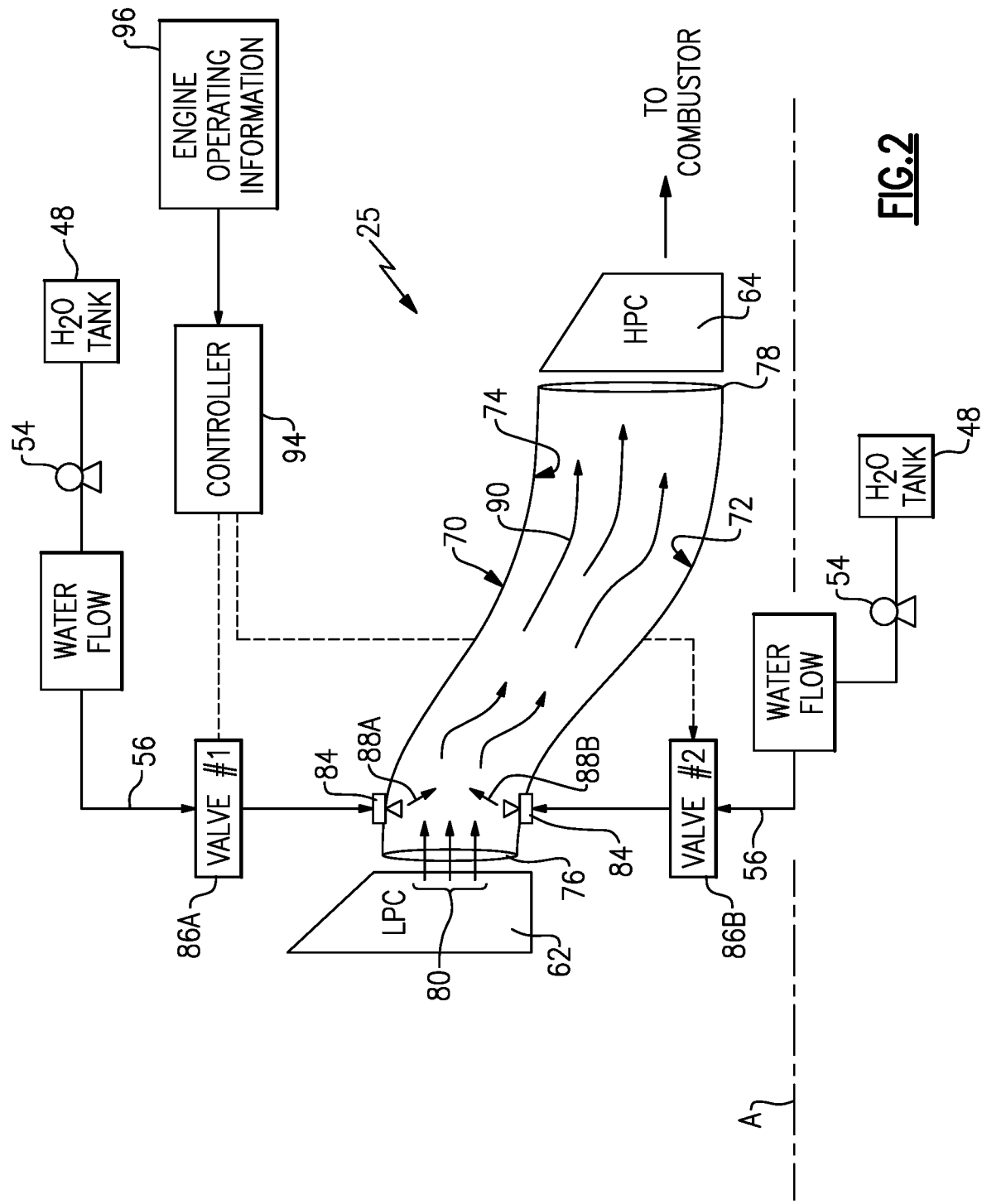
FIG. 2 is a schematic view of a portion of an example intercooler system embodiment.
Figure 3:
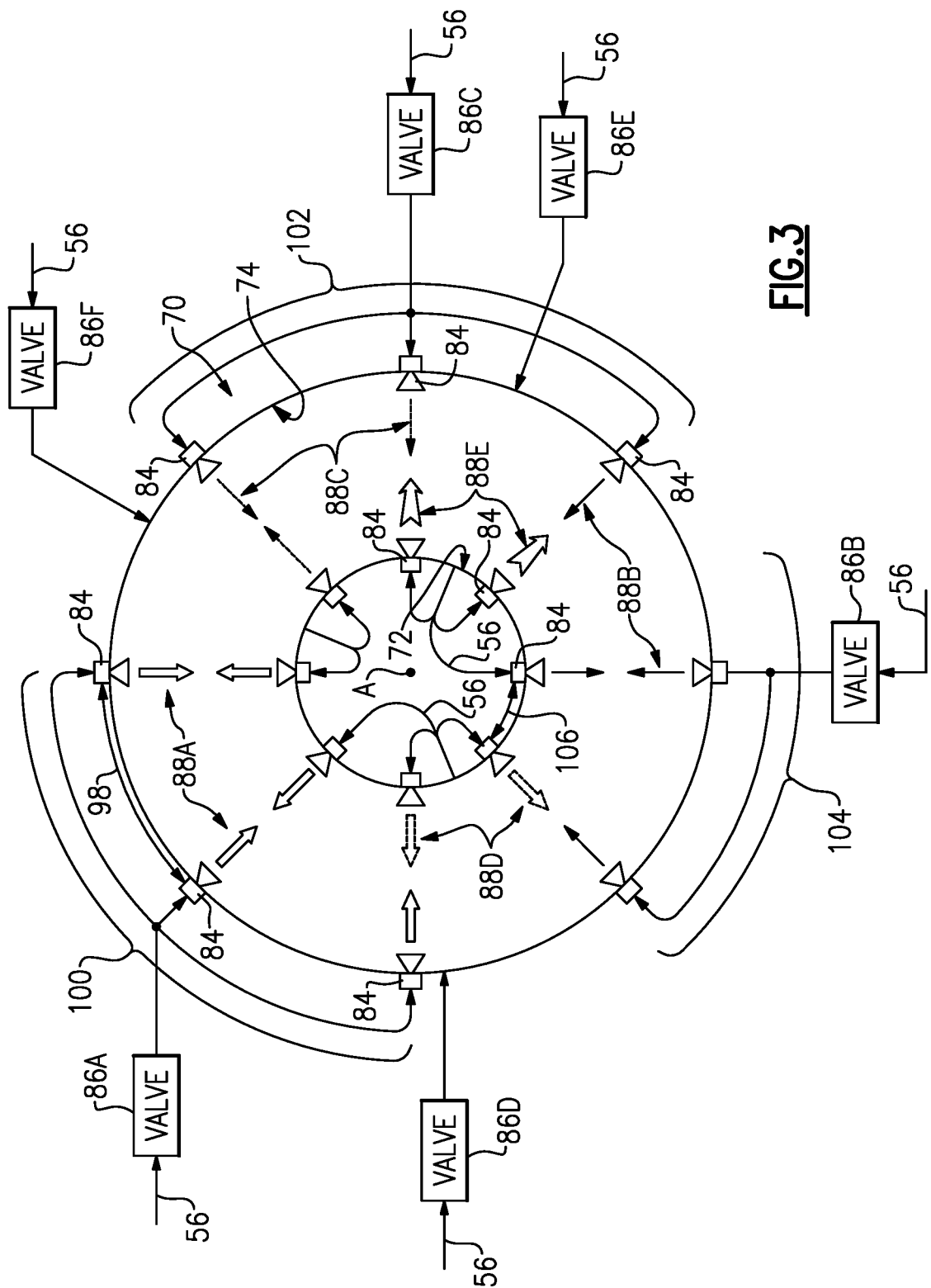
FIG. 3 is a schematic axial view of the example intercooler system embodiment.

Referring to FIGS. 2 and 3, water (depicted as waterflows 88A, 88B, and so on, and referred to herein as a waterflow 88) is injected into the passage 70 through one or more injectors 84 that are circumferentially spaced apart (best shown in FIG. 3) about an inner radial surface 72 and an outer radial surface 74. The passage 70 is annular about the engine longitudinal axis A and provides for the communication of the pressurized core flow 80 from the LPC 62 to the HPC 64. The amount of intercooling waterflow 88 injected into the passage 70 by each of the injectors 84 is varied to control and change circumferential variations in temperature, flow and other parameters that may influence compressor operation.

Pressurized airflow 80 through an exit 76 of the LPC 62 is communicated through the passage 70 to an inlet 78 for the HPC 64. The injectors 84 are circumferentially spaced apart a distance 106 about the inner radial surface 72 and a distance 98 about the outer radial surface 74. Each of the injectors 84 are supplied the intercooling waterflow 56 through at least one valve 86 that is controlled by a controller 94. In one example embodiment, a plurality of valves 86A-E are provided to supply groups of a corresponding plurality of the injectors 84.

Although the example valves 86A-E are disclosed as controlling waterflow 56 to several of the injectors 84, other combinations and numbers of valves 86A-E could be utilized and are within the contemplation of this disclosure. For example, an individual valve could be associated with each of the injectors 84 such that waterflow to each of the injectors 84 is individually controlled. Alternatively, fewer valves could be utilized to supply and control waterflow to differing groups of the injectors. Each of the valves 86A-E may be configured to provide proportional control of water to each corresponding injector 84. Moreover, additional valves, conduits and fluidic storage and communication structures would be included to communicate the waterflow to each of the valves 86A-E.

FIG. 3 illustrates the injectors spaced the circumferential distance 98 apart about the outer radial surface of the passage 70. The example injectors 84 are illustrated as supplying different volumes of intercooling waterflow 88 in different circumferential zones 100, 102 and 104. The different zones 100, 102 and 104 are utilized as examples of differing distributions related to compressor flows. The differing distributions may include distributions in temperature, flow and/or swirl. Other flow parameters may also be considered and accommodated with varying injection of intercooling waterflow. In each zone, a flow volume of the intercooling waterflow 88 is provided to accommodate the varying distribution.

FIG. 3 illustrates the differing waterflows 88A-E at each injector 84 by differently sized arrows. In one example embodiment, a first zone 100 is provided with a first intercooling waterflow schematically shown by arrow 88A that is different than a second intercooling waterflow 88B indicated by different arrows within a second zone 102. A third waterflow 88C within a third zone 104 is different than either of the first and second waterflows 88A and 88B.

Additionally, injectors 84 disposed about the inner radial surface 72 may provide additional variations in waterflows. In the illustrated example embodiment, waterflows 88D and 88E are different than other flows about the outer radial surface 74. The variation in each of the waterflows 88A-E is utilized to tailor the combined air and waterflow 90 (FIG. 2) that is eventually communicated to the HPC 64 based on a desired and/or current operating point.

The controller 94 controls each of the valves 86A-E based on engine operation information 96. The engine operation information 96 includes information indicative of different operating conditions. For example, the controller 94 may control the volume of water injection, based on an engine operating condition as indicated by an engine setting. The engine setting may be indicated by a throttle position or any other engine setting. Moreover, the controller 94 may control the volume of water injection based on other operating conditions, parameters, such as pressure, temperature, ambient conditions, and any other condition on which engine control may be based.

Alternatively, the controller 94 may operate the valves 86A-E based on a feedback loop utilizing measurements indicative of compressor stability or that provides a direct measurement of a flow inlet profile to the HPC inlet 78.

The example controller 94 is a device and system for performing necessary computing or calculation operations of the valves 86-A-E and the intercooling system 25. The controller 94 may be specially constructed for operation of the valves 86A-E and intercooling system 25, or it may comprise at least a general-purpose computer selectively activated or reconfigured by software instructions stored in a memory device. The controller 94 may further be part of full authority digital engine control (FADEC) or an electronic engine controller (EEC).

Figure 4:
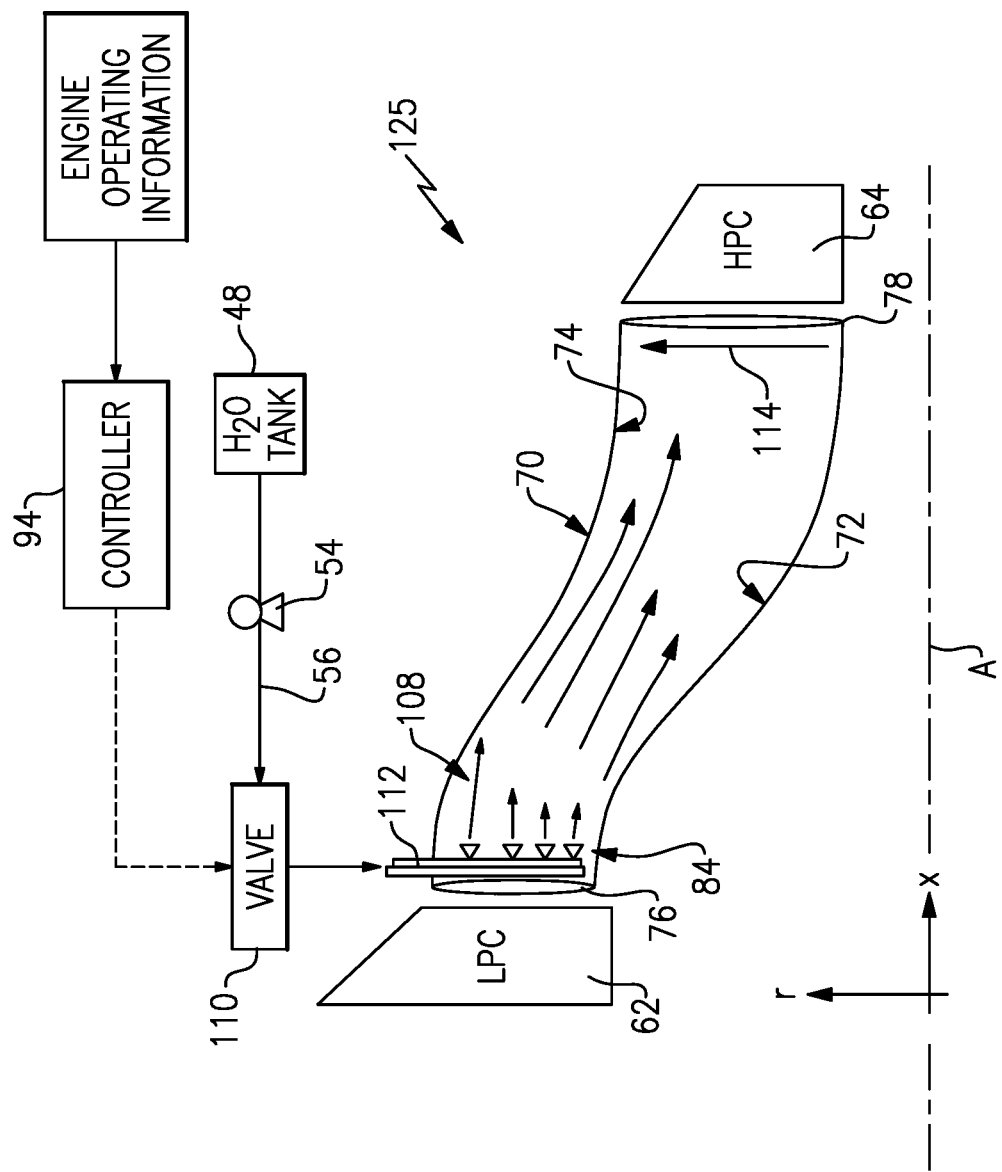
FIG. 4 is schematic view of another example intercooling system embodiment.
Figure 5:
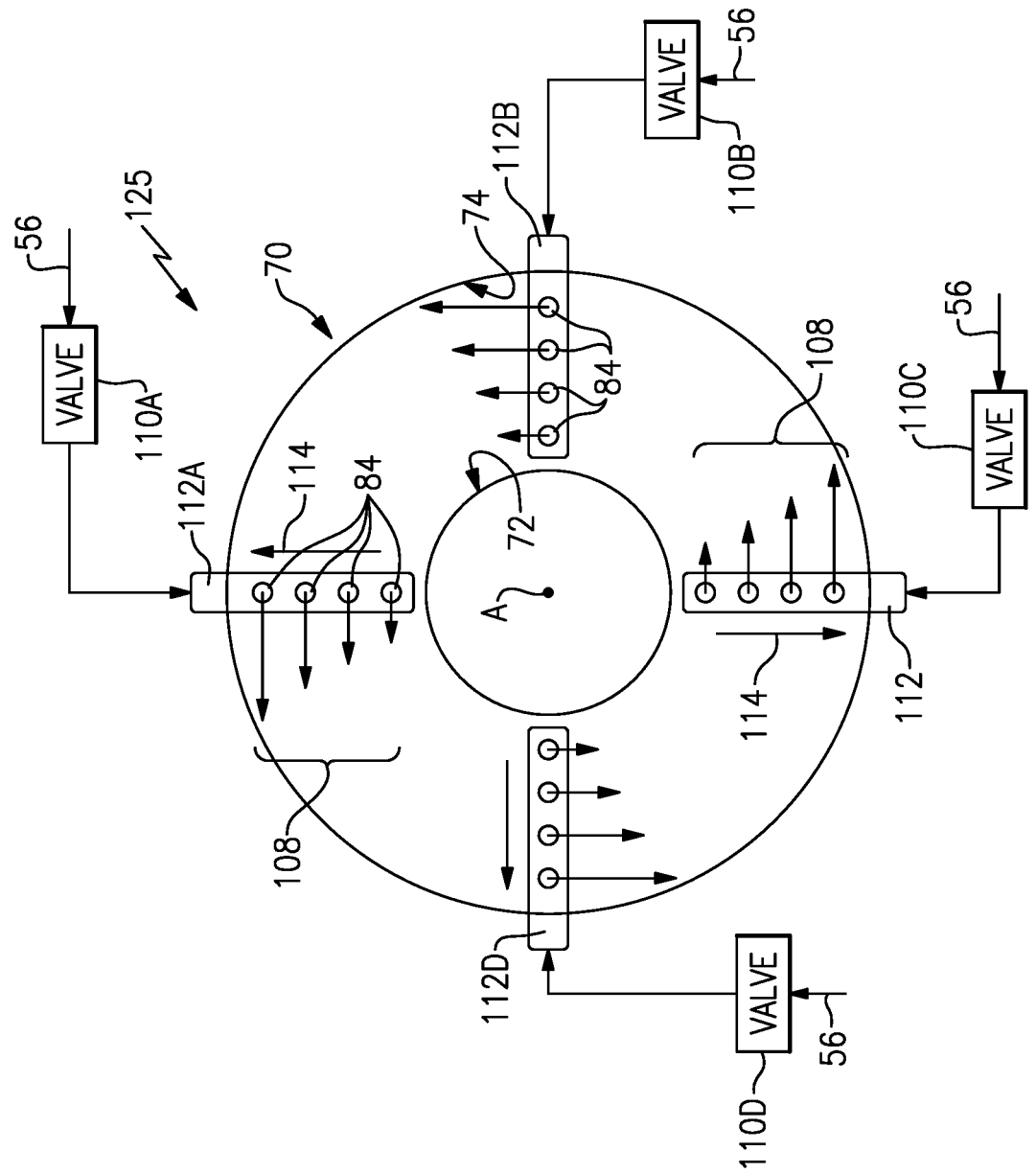
FIG. 5 is a schematic axial view of the example intercooling system embodiment.

Referring to FIGS. 4 and 5, another example intercooling system 125 is schematically shown and includes injectors 84 arranged radially between the inner radial surface 72 and the outer radial surface 74 of the passage 70. The injectors 84 are provided an intercooling waterflow 56 through one or more valves. A single valve 110 is shown by way of illustrated example in FIG. 4. A controller 94 controls operation of the valve 110 based on a distortion profile schematically indicated by arrow 114. The distortion profile may consist of a temperature profile, flow profile or any other criteria indicative of flows that are controlled for communication to the HPC 64. The disclosed example distortion profile 114 indicates an increase in a direction from the inner radial surface 72 toward the outer radial surface 74. A radial distribution of water injected into the passage is indicated by arrows 108. The arrows increase in length toward the outer radial surface 74 to illustrate an increase in waterflow from the injectors 84 within the radial distribution profile 108.

Although a uniform increase in waterflow distribution profile 108 is shown by way of example, the distribution profile 108 may be non-uniform to correspond with different distortion profiles. Moreover, although the example distortion profile 114 indicates an increase in the radially outward direction, the distortion profile 114 may increase in a direction toward the inner radial surface 72, toward a midway point and/or in a non-uniform manner across the passage 70.

As is best shown in FIG. 5, a plurality of valves 110A-D provide the intercooling waterflow 56 to the injectors 84. In one disclosed embodiment, the injectors 84 are supplied by a corresponding manifold 112A-D. The injectors 84 are shown injecting differing amounts of water depending on the radial position. The differing waterflows may represent different mass flow volumes of water, differing pressures and/or other variations in water injection that could be utilized to accommodate distortions within the passage 70.

In the illustrated example, a single one of the valves 110A-D is illustrated as supplying waterflow to a group of injectors distributed radially. However, it is within the contemplation of this disclosure that multiple valves could be utilized to provide the desired radially distributed differences in the waterflow distribution 108. Moreover, the injectors 84 may be sized differently based on a radial position to provide the desired waterflow distribution.

Accordingly, the disclosed intercooling systems 25, 125 vary waterflow injection radially and circumferentially to accommodate distortions and tailor water injection to influence and control a flow profile communicated to the high pressure compressor.

Although an example engine configuration is described by way of example, it will be appreciated that other engine configurations may include additional structures and features and are within the contemplation and scope of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a core engine including a core flow path where air is compressed in a compressor section, communicated to a combustor section, mixed with fuel, and ignited to generate a high energy gas flow that is expanded through a turbine section, wherein the compressor section includes a low pressure compressor upstream of a high pressure compressor;
an intercooling system configured to inject water into the compressor section to reduce a temperature of a core airflow within the core flow path, the intercooling system including a plurality of injectors for injecting an intercooling waterflow into a portion of a compressor passage, wherein the plurality of injectors are spaced apart about the compressor passage and the injection of the intercooling water flow is varied between the plurality of injectors to influence flow communicated to the high pressure compressor; and
a controller programmed to determine a distortion profile of a combined pressurized air and water flow, and control injection of waterflow through the plurality of injectors to generate the determined distortion profile by varying at least one of a volume and pressure of the intercooling water flow between the plurality of injectors based on the determined distortion profile within a compressor passage between the low pressure compressor and the high pressure compressor.

2. The propulsion system as recited in claim 1, wherein the volume of the intercooling waterflow is varied based on a circumferential position within the compressor passage.

3. The propulsion system as recited in claim 1, wherein the volume of the intercooling waterflow is varied based on a radial position within the compressor passage.

4. The propulsion system as recited in claim 1, wherein a pressure of intercooling waterflow through at least one of the plurality of injectors is different than another of the plurality of injectors.

5. The propulsion system as recited in claim 1, wherein the compressor passage comprises an annular passage for directing an airflow from an exit of the low pressure compressor to an inlet of the high pressure compressor, wherein the plurality of injectors is disposed within the annular passage for generating the combined airflow and water through the annular passage to the inlet of the high pressure compressor.

6. The propulsion system as recited in claim 5, wherein the plurality of injectors are spaced circumferentially apart about both an inner radial surface and an outer radial surface of the annular passage.

7. The propulsion system as recited in claim 5, wherein the plurality of injectors are spaced radially apart between an inner radial surface and an outer radial surface of the annular passage.

8. The propulsion system as recited in claim 1, wherein the controller is programmed to receive information indicative of an engine operating condition and to control injection of waterflow through the plurality of injectors based on the information indicative of the engine operating condition.

9. The propulsion system as recited in claim 1, wherein the controller is programmed to receive information indicative of a distortion profile within the compressor passage and to control injection of the waterflow based on the information indicative of the distortion profile.

10. The propulsion system as recited in claim 9, wherein the distortion profile comprises one of a temperature profile and a flow pattern profile.

11. The propulsion system as recited in claim 1, further comprising a condenser arranged along the core flow path and configured to extract water from the high energy gas flow.

12. The propulsion system as recited in claim 11, an evaporator arranged along the core flow path and configured to receive a portion of the water extracted by the condenser to generate a steam flow, wherein the steam flow is injected into the core flow path upstream of the turbine section.

13. An intercooling system for a turbine engine comprising:
a condenser arranged along a core flow path and configured to extract water from an exhaust gas flow;
a pump where water from the condenser is pressurized;
a plurality of injectors for injecting an intercooling waterflow into a portion of a compressor passage, wherein the plurality of injectors are spaced apart about the compressor passage and the injection of the intercooling water flow is varied between the plurality of injectors to influence flow communicated to a high pressure compressor; and
a controller programmed to determine a distortion profile of a combined pressurized air and water flow, and control injection of waterflow through the plurality of injectors to generate the determined distortion profile by varying at least one of a volume and pressure of the intercooling water flow between the plurality of injectors based on the determined distortion profile within a compressor passage between a low pressure compressor and the high pressure compressor.

14. The intercooling system as recited in claim 13, wherein at least one of a volume and pressure of the intercooling waterflow is varied based on a radial position within the compressor passage.

15. A method of operating a compressor section of a turbine engine comprising:
generating a pressurized airflow through a first compressor section;
injecting a pressurized waterflow with at least one of a plurality of injectors to generate a combined pressurized air and waterflow;
communicating the combined pressurized air and waterflow to a second compressor section downstream of the first compressor section;
determining a distortion profile of the combined pressurized air and waterflow; and
varying at least one of a volume and pressure of the intercooling waterflow between the plurality of injectors based on the determined distortion profile within a compressor passage between the first compressor section and the second compressor section.

16. The method as recited in claim 15, further comprising, varying at least one of a volume and pressure of the intercooling waterflow is varied based on a circumferential position within the compressor passage.

17. The method as recited in claim 15, further comprising, varying wherein at least one of a volume and pressure of the intercooling waterflow is varied based on a radial position within the compressor passage.

* * * * *